United States Patent [19]

Adams et al.

[11] 4,316,409

[45] Feb. 23, 1982

[54] CARBONATED BEVERAGE CONTAINER

[75] Inventors: Joan M. Adams, Fairview; Myron B. Shoaf, Cranbury, both of N.J.; Carl E. Bochmann, Cleveland; Peter A. Basile, Hudson, both of Ohio

[73] Assignee: General Foods Corporation, White Plains, N.Y.

[21] Appl. No.: 83,737

[22] Filed: Oct. 10, 1979

[51] Int. Cl.$^3$ .............................................. A23L 2/40
[52] U.S. Cl. ............................... 99/275; 261/DIG. 7; 426/561
[58] Field of Search .................... 99/275, 323, 323.1, 99/323.2; 426/561, 78, 591, 477; 261/DIG. 7, 121 R, 133, 18 R; 220/1 E; 366/130

[56] References Cited

U.S. PATENT DOCUMENTS

| 2,073,273 | 3/1937 | Wetstein | 99/323.1 |
| 2,591,990 | 4/1952 | Wisdom | 261/DIG. 7 |
| 2,805,846 | 9/1957 | Dewan | 261/DIG. 7 |
| 3,492,671 | 1/1970 | Hovey | 99/323.1 |
| 4,003,555 | 1/1977 | Swartz | 220/1 E |
| 4,186,215 | 1/1980 | Buchel | 99/323.1 |

FOREIGN PATENT DOCUMENTS

101048  5/1937  Australia ........................... 99/323.1

Primary Examiner—Robert W. Jenkins
Attorney, Agent, or Firm—Daniel J. Donovan; Bruno P. Struzzi

[57] ABSTRACT

A closed pressurized container for producing a carbonated beverage of superior quality by providing for contact therein of water and a solid carbonation source. The pressurized container is designed to withstand the pressures and temperatures generated during the preparation of a carbonated beverage from a solid carbonation source. In a preferred embodiment, the container is a rigid receptacle in the shape of a wide mouth bottle adapted to receive a large cap or cover. A perforated basket is mounted inside the cover, and is accessible to water in the bottle when that vessel is turned upside down to an inverted position. A spring loaded, manually operated valve is provided in the cover to permit venting of carbon dioxide from the interior thereof after the water-based mixture within the container has become sufficiently carbonated by absorbing carbon dioxide released by contact of water with the solid carbonation source.

13 Claims, 9 Drawing Figures

CARBONATED BEVERAGE CONTAINER

BACKGROUND OF THE INVENTION

1. Field of the Invention

The present invention relates generally to a container for the preparation of carbonated beverages, and more particularly pertains to a container enabling consumer or "at home" preparation of carbonated beverages having substantially the same palatability and effervescence as bottled or canned carbonated beverages. In greater detail, the present invention relates to a container designed to prepare a carbonated beverage from a solid carbonation source.

2. Description of the Prior Art

Attempts to commercialize point-of-consumption or at-home preparation of carbonated beverages in the prior art have not met with sustained success over the years. The principal shortcoming of the several techniques available in the art is that consumer-prepared carbonated beverages have been significantly inferior in one or more aspects to bottled or canned carbonated beverages available in stores and supermarkets. Common complaints leveled at carbonated beverages prepared by consumers are that the quality and quantity of the carbonation (the bubble size and duration of effervescence) do not compare favorably with commercially available, bottled carbonated beverages.

However, consumer preparation of carbonated beverages offers significant advantages over packaged liquid carbonated beverages for several reasons: the requirement for glass, metal or other bulky containers is avoided; the steps of bottling, shipping and storing carbonated beverages consisting of a major percentage of water are eliminated, and accordingly the utility in terms of portability to the user is greatly enhanced. Thus, housewifes, campers, backpackers, hunters, fishermen, outdoor spectators and travellers can enjoy a carbonated beverage without having to transport bulky and heavy quantities of canned or bottled drinks. Further, disposable or returnable cans and bottles would no longer be of major concern to environmentalists who have been seeking ways to conserve both the country's natural resources and beauty.

Dietzel et al. U.S. Pat. No. 1,967,553 discloses apparatus for carbonating a beverage by contacting a water-based liquid with dry ice to sublime the latter into a gaseous state while cooling and carbonating the liquid. The apparatus provides a separate dry ice receptacle positioned above a generating chamber containing the water-based liquid. In this arrangement, the dry ice is not contacted with the liquid in the generating chamber until after closure and sealing of the chamber to avoid the generation of any substantial quantity of gas until after the arrangement is closed and sealed. In use, the generating chamber is partially filled with water, and a charge of dry ice is introduced into the ice receptacle. The cover is closed and sealed, and the dry ice receptacle is then tipped on its side to empty the ice into the water, thereby carbonating and cooling the resultant beverage.

Wetstein U.S. Pat. No. 2,073,273 discloses apparatus for the preparation of a carbonated beverage wherein water and flavoring are placed in a small pressure vessel, and a metal cartridge containing carbon dioxide is inserted into the sealed vessel. The gas cartridge is then pierced, thereby injecting carbon dioxide into the water to form the carbonated beverage. The carbon dioxide further serves the function of pressurizing the vapor space above the liquid, causing the carbonated beverage to pass out of the vessel through a serving nozzle when an external valve is opened. This arrangement met with some limited measure of success in preparing unflavored and unsweetened carbonated water for home use, but the quality of the carbonation was not equivalent to that of bottled club soda.

The prior art includes a significant number of dry compositions for use in preparing carbonated beverages at home. In most of these compositions, sources of carbonate and acid are combined with sweeteners and a source of flavor so that upon addition of the composition to a glass of water, the "ingredients" react to yield carbon dioxide thereby resulting in carbonation of the beverage. Alther U.S. Pat. No. 2,603,569 discloses the carbonation of a citric acid-sucrose complex with a sodium bicarbonate-sucrose complex. Hughes U.S. Pat. No. 2,742,363 discloses the use of the combination of an alkali metal bicarbonate and a sulfonic acid ion exchange resin in its hydrogen form. Diller U.S. Pat. Nos. 2,851,359 and 2,953,459 disclose the combination of a highy soluble phosphate and a slowly soluble phosphate with an alkali metal or ammonium carbonate or bicarbonate to prolong the ebullition of the beverage. Mitchell et al. U.S. Pat. No. 3,241,977 discloses chemical carbonation with citric, adipic or tartaric acid in a finely divided form, which are alleged to approximate the carbonation sensation of cola-type beverages sold in air-tight bottles or cans and produced by a saturated solution containing several volumes of carbon dioxide. Feldman et al. U.S. Pat. No. 3,441,417 discloses a dry beverage composition adapted to be reconstituted with water to produce an effervescent beverage. The composition includes an essential carbonating ingredient, an organic compound having a carbonic acid anhydride group, capable of controlled hydrolysis in water to release carbon dioxide at a substantially uniform rate. Fritzberg et al. U.S. Pat. No. 3,667,962 discloses a carbonation composition utilizing two distinct bodies formed from an aqueous solution of a saccharide, one containing an edible food acid and the other an edible bicarbonate. Upon addition to water, the two tablets dissolve quickly and react to produce carbon dioxide.

Many of the dry powder chemical mixtures have a common and acknowledged defect, an unpleasant taste in the beverage directly resulting from the components of the powder. Hughes U.S. Pat. No. 2,742,363 and Hovey U.S. Pat. No. 3,476,520 attempt to solve this problem by placing the chemicals in a container which is pervious to gas and water but impervious to solid reactants and byproducts. Barnes et al. U.S. Pat. No. 2,975,603 takes another approach by utilizing carbonated ice containing at least 25 milliliters of carbon dioxide per gram of ice as the source of carbonation. Sampson et al. U.S. Pat. No. 3,888,998 and Whyte et al. U.S. Pat. Nos. 3,992,493 and 4,025,655 and Liepa et al. U.S. Pat. Nos. 4,007,134, 4,110,255 and 4,147,808 disclose various carbonation methods, compositions and devices whereby carbon dioxide containing molecular sieves are used to carbonate aqueous solutions.

Despite many attempts in the prior art to develop a system for the preparation of carbonated beverages in the home, none have succeeded in producing a carbonated product equal in flavor, taste, appearance, and quality and quantity of carbonation to commercially packaged, liquid carbonated beverages as are available in retail stores and supermarkets.

SUMMARY OF THE INVENTION

Accordingly, it is an object of the present invention to provide a simple and efficiently designed container for the preparation of carbonated beverages having a carbonation quality and quantity equal to or better than that of commercially available carbonated beverages sold in a bottle or can.

A further object of the present invention is to provide a container for the preparation of a carbonated beverage from a variety of solid carbonation sources. It is contemplated that such a container should accommodate a number of carbonation sources, alone or in combination, comprising for example, carbonated ice, chemical couples, carbon-dioxide containing solid absorbents, including uncoated and coated molecular sieves and activated charcoal, as well as combinations of these carbonation sources. Several carbonation sources are disclosed in commonly assigned, previously filed, copending patent applications. As used in the present specification and claims, the term "solid carbonation source" includes the above sources of carbonation within its meaning. For purposes of illustration, in explaining the construction and operation of the container of the present invention, carbonated ice is described as being the source of the carbonation. However, those skilled in the art will appreciate that any of the other "solid carbonation sources" listed above may be substituted for carbonated ice and can be employed alone or in combination with other solid carbonation sources contemplated herein to prepare carbonated beverages with the container of the instant invention. It is further contemplated that although the carbonation ice is described as being in the form of a cylindrical briquette, carbonated ice and other "solid carbonation sources" in various other forms and shapes may be employed in the container of the present invention.

Another object contemplated by the present invention is the provision of a pressurizable container for the preparation of a carbonated beverage from a water-based liquid and a solid carbonation source. A cover is provided for engaging and sealing the container, and includes a basket positioned interiorly thereof. The basket is designed to hold a quantity of a solid carbonation source such as carbonated ice above the level to which the container is normally filled with water. This arrangement results in the advantage that the container may be filled with water and flavorings as desired, the basket loaded with a solid carbonation source, and the cover applied and sealed with respect to the water filled container without resulting in contact between the carbonation source and water. The basket is provided with apertures therein to allow contact between the carbonation source and water after tilting of the covered container, thereby resulting in sublimation of the carbonation source and carbonation and cooling of the resultant beverage.

The basket should have a capacity to hold a sufficient quantity of a solid carbonation source to carbonate the liquid capacity of the container. Ideally, it should be so designed to facilitate loading of the carbonation source into the perforated basket. The cover may have a domed configuration to ensure that the ice and liquid do not contact each other when the covered container is in an upright position. Accordingly the perforated basket may be located above the point where the container and domed lid are joined. Contact between the liquid and the carbonation source cannot be effected in this configuration with the apparatus in an upright position since the maximum height of the liquid level is below the bottom of the perforated basket. This design offers another advantage in that a sufficient vapor head space is always provided above a liquid filled container.

Furthermore in accordance with a preferred embodiment of the invention, the container is a threaded, wide mouth bottle, and the cover is also threaded for engagement therewith. In accordance with another aspect of the invention, the cover is provided with a flat top to provide a stable base for the covered container, whereby after inversion thereof the covered container may be conveniently set down. In accordance with another aspect of the present invention the cover is provided with a vent valve to allow venting of excessive pressure from the interior of the pressurized container prior to disengagement of the cover therefrom. The vent valve may be indented with respect to the top surface of the cover such that setting down of the covered container in an inverted position does not actuate the vent valve.

Furthermore, in the preferred embodiment, the basket is cylindrically shaped to provide for the placement therein of a cylindrically shaped briquette of a solid carbonation source. The lower surface of the basket is formed with a plurality of radially directed, resilient flaps to allow a cylindrical briquette to be placed into the basket by resilient deformation of the flaps. The flaps resiliently return to form the bottom surface of the basket after the briquette is inserted therethrough, such that the flaps retain the carbonation briquette therein. In accordance with yet another feature of the present invention, the container and cover may be formed of plastic, and the basket may or may not be formed as a separate element which may be removably and detachably connected to the interior of the cover.

A container arrangement according to the present invention should incorporate certain minimum design criteria. It must be capable of withstanding the temperatures and pressures generated in the confined space of the container during preparation of the carbonated beverage from a source of carbonation and water. Temperatures of about 40° to 70° F. and pressures of about 40 to 90 psig are developed within the container pursuant to the teachings herein. The container arrangement should also be provided with a convenient manner in which water and carbonation source and, optionally, color, flavor and/or sweetener additives may be introduced therein. Further, the container should provide a convenient manner to pour or dispense the carbonated beverage therefrom after preparation. Ideally, the arrangement should be compact, lightweight and portable to facilitate usage in a variety of remote locations. These features are not necessary when the usage of the container arrangement is limited primarily to the home, but are desirable to provide a versatile product. The size of the container is not critical, but for convenience should be available in a variety of sizes, so as to enable the preparation of from 1 glass to 2 liters or more of carbonated beverage. Additionally the container arrangement should be designed so as to be safely and easily usable by a school child or an adult and, further should be designed so that a pre-school or small child cannot readily use it or at least not injure himself in any attempt at usage. Also the carbonation source may be introduced into the container in a manner such that it does not contact the water until the arrangement is sealed and the user desires to carbonate the beverage.

Accordingly, it is a primary object of the present invention to provide a novel pressurizable vessel for the preparation of carbonated beverages.

Another object of the present invention lies in the provision of a pressurizable vessel for the preparation of a carbonated beverage in a convenient and relatively safe manner from a water-based liquid and a briquette of a solid carbonation source.

BRIEF DESCRIPTION OF THE DRAWINGS

The foregoing and other objects and advantages of an inventive pressurizable vessel for the preparation of a carbonated beverage from a water-based liquid and a carbonation source may be more readily understood by one skilled in the art, having reference to the following detailed description of several preferred embodiments thereof, taken in conjunction with the accompanied drawings in which identical reference numerals are utilized to refer to like elements throughout the several views, and in which.

DETAILED DESCRIPTION OF THE DRAWINGS

Figure 1:
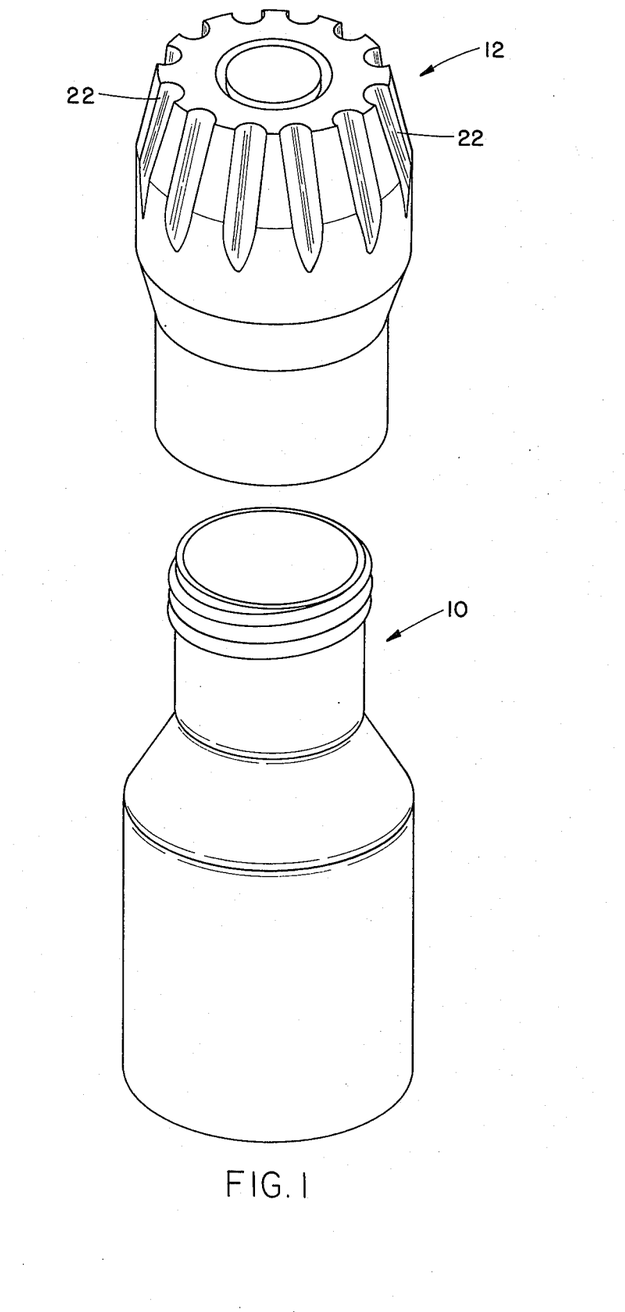
FIG. 1 is a frontal perspective view of a first embodiment of a pressurizable container for the production of a carbonated beverage, with the cover for the container being illustrated as being removed and separated therefrom.

Referring to the drawings in detail, FIG. 1 is a frontal perspective view of a first embodiment of a pressurizable container 10 having a cover assembly 12 therefor. In the embodiment of FIG. 1, the container 10 is in the form of a wide mouth jar having external threads 14 provided around its mouth. In one designed embodiment of the present invention, container 10 is constructed of a polycarbonate plastic, and has a thickness of approximately ⅛" to withstand pressures internally of the container during forced carbonation of a beverage therein. The external contour of container 10 may vary considerably from one embodiment to another, as exemplified by the different shapes of the container shown in FIGS. 1, 3 and 6.

Figure 2:
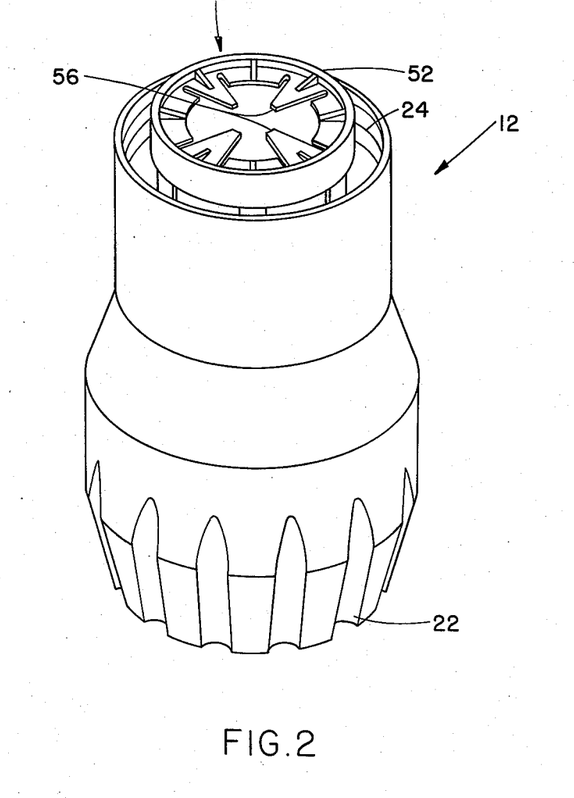
FIG. 2 illustrates a perspective view of the cover of FIG. 1 illustrated in an inverted position.
Figure 3:
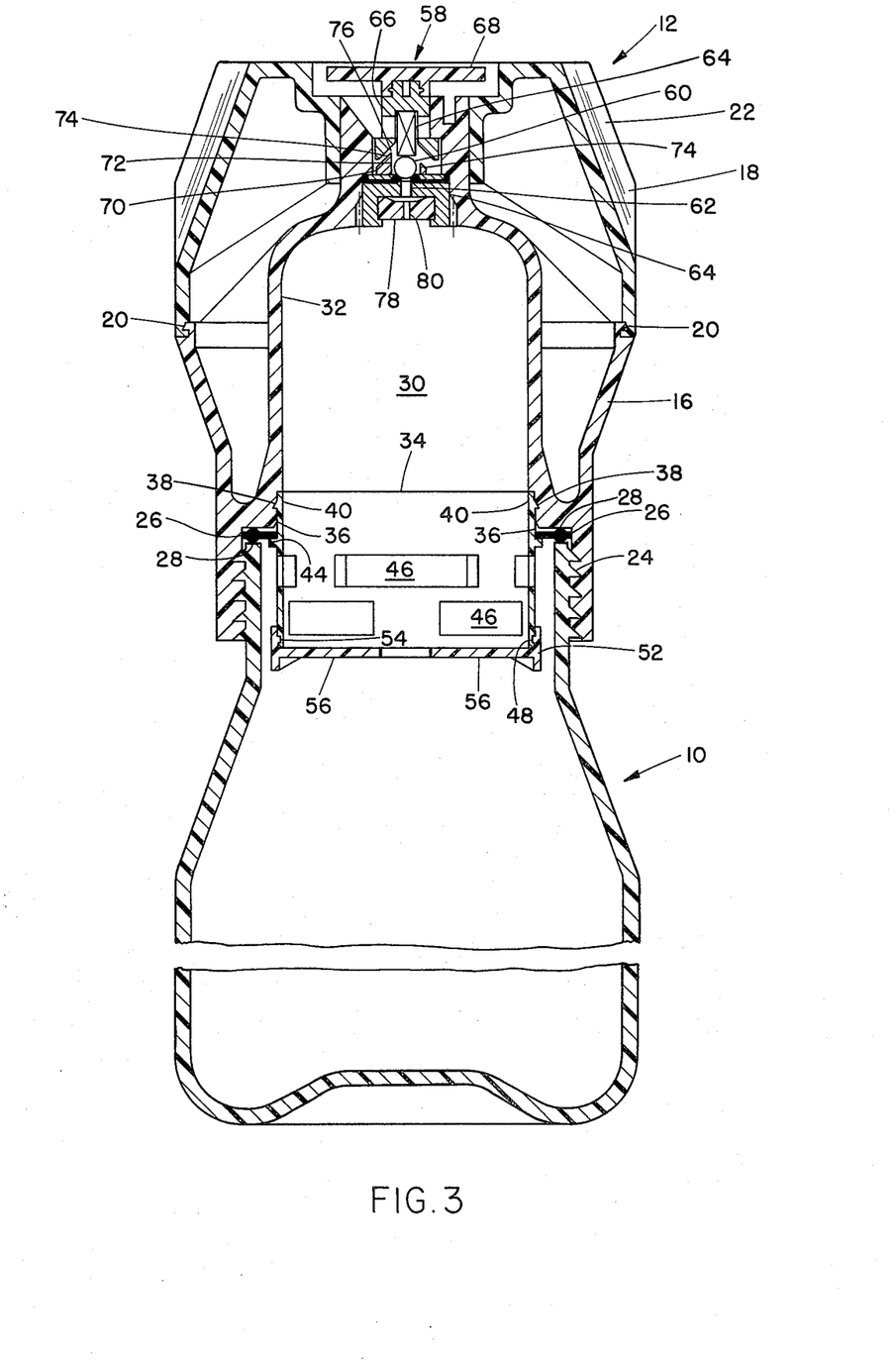
FIG. 3 is an elevational sectional view of the embodiment of FIGS. 1 and 2 with the cover completely threadedly engaged onto the bottle.

The cover assembly 12 is illustrated in greater detail in FIGS. 2 and 3, and may also be formed from a polycarbonate plastic. The cover assembly 12 is constructed with a lower housing portion 16 and an upper housing portion 18, with the two portions being snap fitted, one to the other along a circular seam 20 extending around the outer periphery of the cover. The cover assembly includes a plurality of large substantilly vertically extending grooves 22 formed in the upper and outer peripheral portions thereof to enable a user of the arrangement to readily grasp and turn the cover assembly relative to the container. Threads 24 are provided internally of the cover assembly to enable it to threadedly engage the threads 14 on container 10. An annular seal 26 is provided between the container and cover assembly to assure a pressure-tight seal between the two members. The annular seal may have upper and lower raised annular ridges 28 to enable a pressure-tight seal to be obtained, and may be formed by molding from a suitable elastic material such as EPTM synthetic material.

In the particular embodiments disclosed herein, a cylindrically shaped solid carbonation source in the form of a carbonated ice briquette is adapted to be inserted into the cover assembly. The briquette may be formed in a manner as specifically disclosed and claimed in U.S. Pat. Nos. 2,975,603, 3,086,370 and 3,217,503. Alternatively, other solid sources of carbonation may be employed, as explained previously.

Carbonated ice prepared in accordance with the disclosure of the aforementioned patent application resembles ordinary ice. It may be cloudy or clear in appearance, and is substantially free of liquid. This ice product has a freezing point substantilly above 0° C., i.e., it may be as high as 14° C. or more but it is most commonly about 4° to 8° C. A characteristic feature of this gasified ice product is its ability to release carbon dioxide at a controllable rate when melted, as when added to an aqueous liquid. The carbonated ice so prepared has a density in the order of 0.94–0.99 g. per cc. or higher which is slightly higher than ordinary ice, which has a density of about 0.92 g. per cc.

In general carbonated ice is a frozen product of water and gaseous carbon dioxide which, upon contact with an aqueous medium carbonates the medium in a manner faster than expected when compared to gaseous carbon dioxide. The term carbonated ice refers to a wide variety of physical and chemical combinations of carbon dioxide and ice, and includes any frozen combination of carbon dioxide and water in which the carbon dioxide is present in an amount varying from about 10 to 120 milliliters of $CO_2$ per gram of ice. The carbonated ice may be a hydrate or clathrate of carbon dioxide in water.

In practicing the present invention, many configurations of carbonated ice may be employed. Thus, it can be in the form of large or small pieces of carbonated ice prepared from gaseous carbon dioxide, or the snow which is prepared from liquid carbon dioxide or in the form of controlled-sized briquettes. The latter are preferred because of their ease of handling and storage. In addition, the briquettes are free of the popping or minor explosions which are produced when carbon dioxide is unevenly released from other forms of carbonated ice.

A briquette can be coated with ice to improve its stability. When the briquette is added to water to prepare a carbonated beverage, the outer coating will have dissolved in the drink by the time the carbon dioxide level in the water is sufficient to produce a carbonated drink. When preparing carbonated soft drinks according to the teachings herein, the color, flavoring and sweeteners can be combined in a syrup form or a powder form and added, along with the water, to the beverage preparation container.

The water employed to prepared carbonated beverages according to the present invention may be any type of drinking water available to the user. Household tap water, bottled water, fresh drinking water from a campsite stream, etc., are examples of water available at point of consumption preparation of these carbonated beverages. It is obvious, of course, that the presence of added chemicals and/or minerals in the water employed may detract from the flavor of the carbonated beverage prepared according to this invention, and in view of this, the user may wish to employ extremely pure water or at least water with little or no off-taste. Aside from such preferences, any available water of drinking quality may be employed to practice this invention.

The quantities of water and solid carbonation source required to prepare carbonated liquids are variable, depending upon such factors as the degree of carbonation desired, the carbon dioxide content of the carbonation source, the nature of the flavorant employed, and the head space available in the preparation container. Generally, the arrangement should have an available head space or free vapor space of about 10–50 volume percent, and quantity and quality of the solid carbonation source should be sufficient to produce a pressure of about 40–200 psig in the apparatus (preferably 40–90 psig for carbonated ice) and a carbonation volume of at least 2, preferably 3–5, at the completion of the carbonation process.

This invention may be used to provide a supply of carbonated water similar to club soda. In one of its preferred embodiments, the user may employ this invention to prepare a variety of carbonated beverages. Where compatible as with dry carbon dioxide absorbents mixed with a dry beverage mix, color, flavorants and sweetening additives may, optionally, be incorporated into the solid carbonation source or the water or may be added directly to the preparation apparatus. In this fashion, such familiar beverages as carbonated cola, carbonated root beer, carbonated lemon-lime soda, carbonated cream soda, etc. can be prepared at home. Only the ingenuity of the user, the availability of flavorants and the individual tastes of the consumer limit the variety of carbonated beverages which may be prepared by the present container arrangement.

The cover assembly serves the function of retaining the carbonation briquette therein, and for that purpose includes an internal cylindrically shaped compartment 30. The upper portion of the cylindrical compartment is formed on the inside 32 of the lower housing portion of the cover assembly, and the lower portion thereof is formed by a cylindrically shaped basket 34. Basket 34 engages the lower portion of the cover assembly in a cylindrical surface 36 provided therein. The surface 36 has an annular indentation 38 which functions to engage corresponding resilient tabs 40 on the basket. The tabs 40 accommodate slight radial inward and outward movements, and are provided with radially extending projections 42 to securely but releasingly engage the annular indentation 38 in the cylindrical surface 36 of the cover assembly. An external annular raised ridge 44 is provided around the top of the basket 34, and is adapted to abut against the lower surface of the sealing ring 26 to retain the sealing ring in place within the cover assembly. A plurality of circumferentially extending slotted apertures 46 are formed in the lower cylindrical surface of the basket to provide for the entrance of water therethrough into the compartment when the covered and sealed container is tilted to an inverted position. An annular groove 48 is formed around the lower peripheral surface of the basket 34 to engage a gate member 50 forming the lower surface of the cylindrical compartment. Gate member 50 has an annular outer portion 52 with radially inwardly retainer projections 54 which engage annular groove 48 in the lower external portion of the basket. A plurality of radially inwardly extending flap elements 56 are provided in the gate 50, with the flaps being resilient in nature to enable a cylindrically shaped briquette of carbonated ice to be inserted therethrough without removal of the gate member from the cylindrical basket. The gate member 50 may be molded from a suitable elastic material such as EPTM synthetic material.

Figure 4:
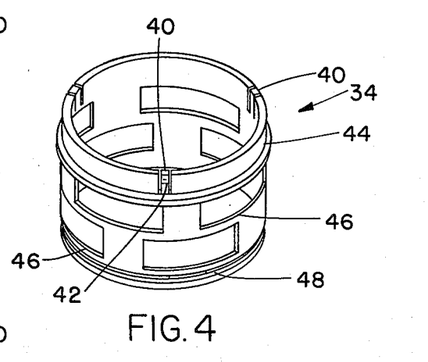
FIG. 4 is a top perspective view of the carbonation source basket provided on the interior of the cover of the first embodiment of the invention.
Figure 5:
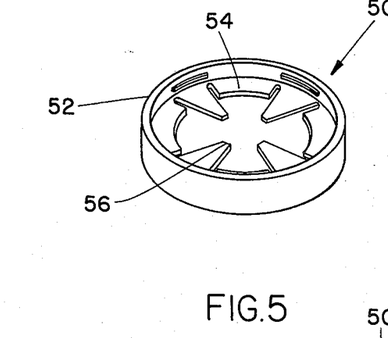
FIG. 5 illustrates a top perspective view of the bottom flap element for the carbonation source basket shown in FIG. 3.
Figure 7:
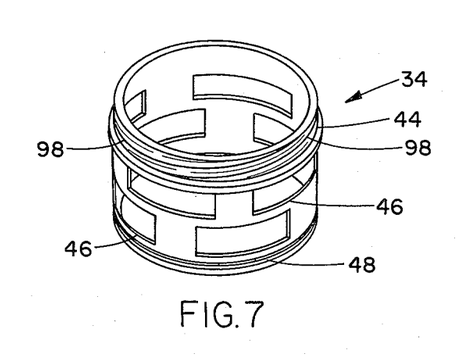
FIG. 7 illustrates another embodiment of a basket for retaining a briquette of a solid carbonation source.

FIG. 7 illustrates another embodiment of a basket 34 for retaining a briquette of a solid carbonation source. This embodiment is similar in many respects to the basket illustrated in FIG. 4, but includes the following salient distinguishing features. The basket has threads 98 formed around its upper external circumference which threadedly engage corresponding internal threads in the interior of cover assembly 12 to retain the basket securely in place relative thereto. In yet another embodiment, the basket may be formed as an integral portion of the cover, and is not releasable therefrom.

A vent valve 58 is provided in the top of the cover assembly to enable venting of carbon dioxide from the interior of the container to atmospheric pressure after the water-based liquid within the container has become sufficiently carbonated by absorption of carbon dioxide released by contact of water with the carbonated ice. The construction of the vent valve is conventional in nature, and includes a ball element 60 seated against an axially extending bore 62 formed in a seat member 64. The ball 60 is biased against the bore 62 by an axially extending resilient spring 64 bearing against the upper surface of the ball and the lower surface of a valve plunger element 66. A valve actuator button 68, situated just below the upper surface of the cover top surface, bears against the upper surface of plunger 66. The ball 60 is surrounded by a ball actuator element 70 having an axially extending bore 72 formed therethrough in which ball 60 is situated. The valve actuator 70 has a conically-shaped upper surface 74, and the axially extending bore 72 is radially offset with respect to the conical surface. The valve actuator 70 includes a corresponding lower annular surface 76 which upon depression of button 68, contacts the upper conical surface of ball actuator 70. The radial offset of ball retaining bore 74 then forces the ball to move radially, to the right as illustrated in FIG. 3, thereby dislodging it from the valve seat and allowing carbon dioxide to be vented therethrough to the atmosphere. A cylindrically shaped flow restrictor element 78 is provided below bore 62, and the vented gases flow through a central bore 80 in the flow restrictor, through central bore 62 past the ball element 60, through the valve plunger 60 and past the valve button to the atmosphere. The spring bias against ball element 60, urging it into sealing contact with the valve seat formed by bore 62, establishes a predetermined pressure at which the ball will be unseated to relieve any excessive pressure that might be generated within the container.

A cycle of usage of the embodiment described thus far is as follows. A person using the apparatus fills the container to a water line indicated on the container below the lower surface of gate member 50 when the cover is completely threaded onto the bottle 10. A suitable flavoring, if desired, is added to the water base. Alternatively, club soda is produced if no flavoring is added to the beverage. A cylindrical briquette of carbonated ice, which may be produced pursuant to the teachings of Mitchell et al U.S. Pat. No. 3,333,969 is inserted into the briquette compartment in the cover simply by pressing it against the yieldable flaps 56 of the gate member which, after insertion of the briquette, yieldably return to an unbiased position to retain the ice briquette therein. The cover assembly is then threadedly engaged onto the container and tightened relative thereto to seal the capped container. The sealed container is then inverted into an upside down position to allow water to flow into contact with the carbonated ice and generate carbon dioxide. During the time period required to carbonate the beverage, the inverted container may be set down upon the flat top surface of the cover assembly. After the passage of a period of time sufficient to allow the carbon dioxide to be sublimed and absorbed into the beverage (e.g. ten to twenty minutes), the container is then turned to a normal upright position. The button element of the vent valve is then pressed to vent excessive carbon dioxide from the capped container, thereby lowering the interior pressure to approximately atmospheric pressure. The cover assembly may then be removed from the container.

Figure 6:
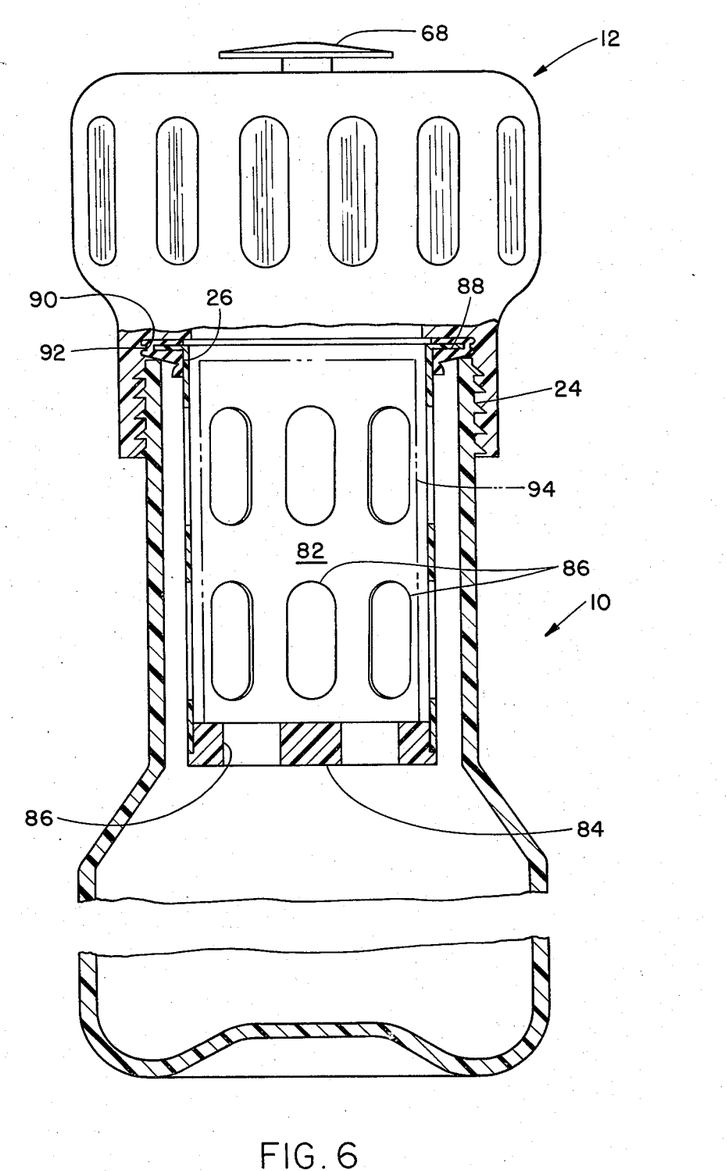
FIG. 6 is an elevational partially sectional view of a second embodiment of the present invention.

FIG. 6 illustrates a second embodiment of the present invention, which is substantially similar to the first described embodiment in many essential respects, but differs therefrom in the following significant features. In this embodiment, the basket for the carbonated ice is in the shape of a cup 82 having a lower surface 84 formed as a separate element but permanently fastened to the basket as by a suitable adhesive or glue. Apertures 86 are formed in both the side and bottom walls of the basket to provide access to a briquette 94 by water after inversion of the covered and sealed container. A radially projecting, circumferentially extending annular lip 88 is provided around the top of the basket, and serves to secure the sealing ring in place at that location. Further the sealing element 26 between the container and cover assembly has a different cross sectional configuration. The outer radial edge of the seal is provided with a circumferentially extending annular groove 90 which coacts with a circumferentially extending, radially projecting annular lip 92 in the cover assembly to retain both the seal and the basket in position once the groove in the basket is resiliently deformed past the circumferentially extending lip 92.

The operation of this embodiment is substantially the same as the operation of that previously described, except that insertion of the carbonated ice briquette into the cover assembly requires removal of the basket from the cover, placement of the briquette into the basket from its top, and reinsertion of the basket back into the cover.

Figure 8:
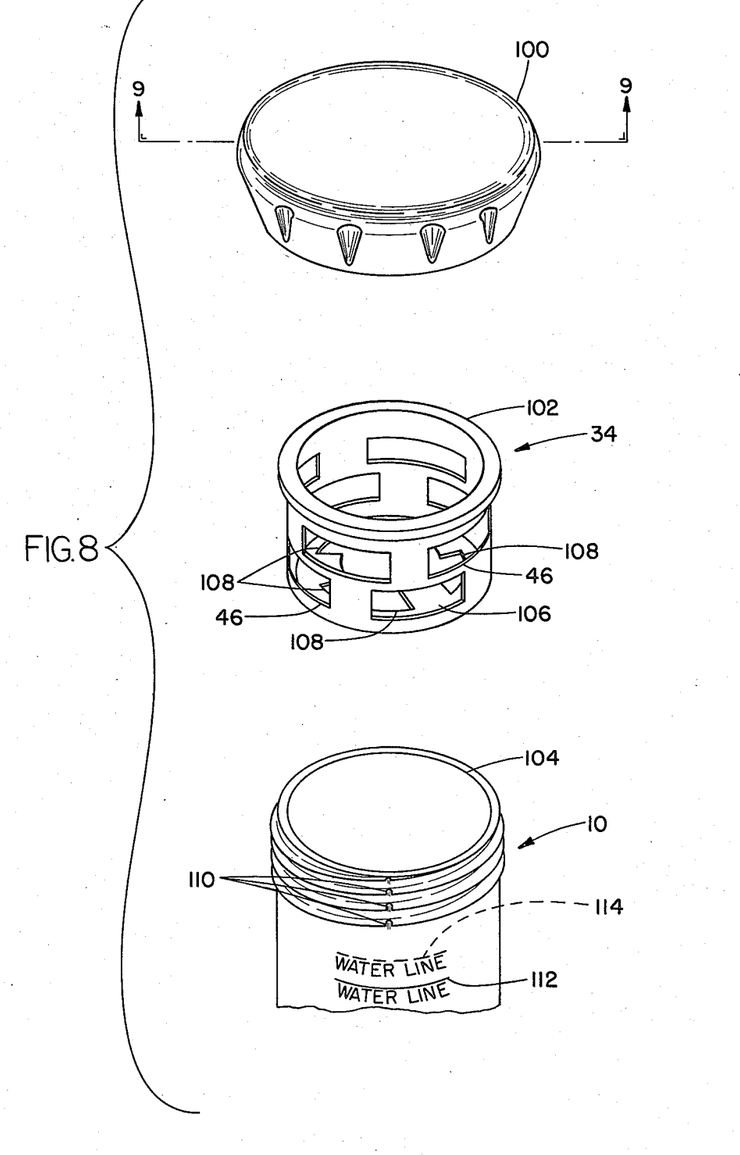
FIG. 8 is an exploded frontal perspective view of a relatively simple embodiment of a pressurizable container.
Figure 9:
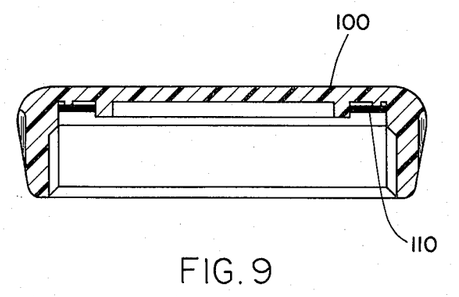
FIG. 9 is a sectional view of a the container lid of FIG. 8, taken along line 9—9 in FIG. 8.

FIG. 8 and 9 illustrate a simplified embodiment of the present invention wherein a cover assembly 100, illustrated in cross section in FIG. 9, omits many of the detailed features of previously described cover assemblies. A basket 34 for a solid carbonation source has an upper flange 102 which forms an annular seal against the upper surface 104 of a pressurizable container 10. Basket 34 includes a plurality of circumferentially extending apertures 46, and also includes a bottom wall 106 which has a plurality of radially extending apertures 108 formed therein. The container 10 includes a longitudinally extending vent slot 110 formed in the threads which engage cover 100.

In operation, a briquette of a solid carbonation source is placed in basket 34 which is then inserted into the neck of container 10. Cover 100 is then threadedly engaged onto the threads on the top of container 10, and tightened against upper flange 102 to seal the assembly. The container is then inverted to allow the water-based solution therein to flow through apertures 46 and 108 into contact with the carbonation source, thereby resulting in carbonation of the beverage.

After carbonation of the beverage, cover 100 is threadedly disengaged from container 10 which releases the seal between the upper surface 104 of the bottle and an annular elastic seal 110 in cover 100. This results in excessive pressure in the container arrangement escaping through longitudinal vent slot 110 to release excessive internal pressure thereof prior to complete disengagement of cover 100 from the container 10. Accordingly, missiling of cap 100 or other undesirable results are effectively prevented.

The arrangement of FIG. 8 may be operated in one of two modes or fashions. A water line 112 may be placed on container 10 at a level beneath the bottom wall 106 of the basket 34, which would prevent contact between the water and carbonation source until after inversion of the container. Alternatively, the water line may be marked at location 114, above the bottom wall 106 of basket 34. This would result in contact between the water and part of the carbonation briquette upon placement of basket 34 into the water-filled container prior to securement of cover 100 onto the container. In this arrangement, an amount of carbon dioxide is released into the atmosphere prior to the threaded engagement of cover 100 onto container 10, but his slight release of gas is not significant and can be effectively ignored. The container 10 is then placed in an inverted position.

While several embodiments have been described in detail herein, it will be apparent to one of ordinary skill in this art that many other embodiments are possible within the teachings of the present invention. For instance, in one embodiment a hinged perforated plate is provided at the lower end of the ice basket. The hinged, perforated plate is located at the open end of the cover, extending across and partitioning off the inside thereof. During usage, the plate is swung out of position, carbonated ice is loaded into the inside of the cover, and the plate is then placed back into position and retained thereat by fastening means provided for that purpose. The perforated cover retains the carbonated ice in the domed cover separating it from the water in the lower portion of the apparatus, but permits contact between the water and the carbonated ice when the apparatus is placed in an inverted position.

What is claimed is:

1. A pressurizable vessel for the preparation of a carbonated beverage from a water-based liquid and a solid carbonation source, comprising:
   a. a container having an opening therein providing access to the contents thereof;
   b. a cover for engaging and sealing the opening of said container, including a basket positioned interiorly of the cover for holding a quantity of a solid carbonation source above the level to which the container is normally filled with the water-based liquid, whereby the container may be filled with water, the basket loaded with a quantity of a solid carbonation source, and the cover applied, and sealed with respect to the container without resulting in contact between the solid carbonation source and water;

c. a vent valve provided in said cover to allow automatic and manual venting of excessive carbon dioxide from the interior of the pressurized container prior to disengagement of the cover from the container; and d. means for sealing the container to prevent the pressurized contents of the container from contacting atmosphere.

2. A pressurizable vessel for the preparation of a carbonated beverage as claimed in claim 1, said basket having openings therein to provide for contact between the solid carbonation source and the water after tilting of the covered container to result in release of carbon dioxide from the solid carbonation source to form carbon dioxide for carbonation of the resultant beverage.

3. A pressurizable vessel for the preparation of a carbonated beverage as claimed in claim 1, said cover having a flat top to provide a stable base for the covered container when it is inverted and set down, said vent valve having a button for actuation of the valve which is indented with respect to the flat top surface of the cover.

4. A pressurizable vessel for the preparation of a carbonated beverage as claimed in claim 1, said basket being positioned entirely within the cover of said container and having a cylindrically shaped interior to provide for the containment therein of the solid carbonation source.

5. A pressurizable vessel for the preparation of a carbonated beverage as claimed in claim 4, the lower surface of said cylindrical basket being formed of a plurality of radially directed, resilient flaps to allow a cylindrical briquette of the solid carbonation source to be placed into the cylindrical basket by resilient deformation of said flaps, with the flaps resiliently returning to form the bottom surface of the cylindrical basket after the briquette of solid carbonation source is inserted therethrough.

6. A pressurizable vessel for the preparation of a carbonated beverage as claimed in claim 1, said container and cover each being formed of plastic.

7. A pressurizable vessel for the preparation of a carbonated beverage as claimed in claim 1, said basket being formed as a separate element which is removably and detachably connected to the interior of said cover.

8. A pressurizable vessel for the preparation of a carbonated beverage as claimed in claim 1, said basket and cover each being threaded for engagement with each other.

9. A pressurizable vessel for the preparation of a carbonated beverage as claimed in claim 1, said sealing means comprising a cover and a container constructed of a polycarbonate plastic and an annular seal sealingly positioned between said container and said cover.

10. A pressurizable vessel for the preparation of a carbonated beverage from a water-based liquid and a solid carbonation source, comprising:

a. a container having an opening therein providing access to the contents thereof;

b. a cover for engaging and sealing the opening of said container;

c. a basket positioned interiorly of said opening in the container for holding a quantity of a solid carbonation source, whereby the container may be filled with water, the basket loaded with a quantity of a solid carbonation source, and the cover applied, and sealed with respect, to the container;

d. longitudinal vent slots for the venting of excessive carbonation pressure from the interior of the vessel prior to disengagement of the cover from the container.

11. A pressurizable vessel for the preparation of a carbonated beverage as claimed in claim 10, said basket holding a quantity of solid carbonation source above the level to which the container is normally filled with a water-based liquid.

12. A pressurizable vessel for the preparation of a carbonated beverage as claimed in claim 10, said basket holding a quantity of solid carbonation source partially below the level to which the container is normally filled with a water-based liquid.

13. A pressurizable vessel for the preparation of a carbonated beverage as claimed in claims 11 or 12, the basket having opening therein to provide contact between the solid carbonation source and the water after tilting of the covered container and the cover having a flat top to provide a stable base for the container when inverted and set down.

* * * * *

UNITED STATES PATENT AND TRADEMARK OFFICE
CERTIFICATE OF CORRECTION

PATENT NO. : 4,316,409
DATED : February 23, 1982
INVENTOR(S) : Joan M. Adams et al.

It is certified that error appears in the above-identified patent and that said Letters Patent are hereby corrected as shown below:

In column 5, line 46, delete "a" second occurrence; line 59, after "pressures" insert -- generated -- .

In column 6, line 60, change "unevenely" to -- unevenly -- .

In column 7, line 25, before "quantity" insert -- the -- .

Signed and Sealed this

Tenth Day of August 1982

[SEAL]

Attest:

Attesting Officer

GERALD J. MOSSINGHOFF
Commissioner of Patents and Trademarks